United States Patent
Kuo et al.

(10) Patent No.: US 7,554,730 B1
(45) Date of Patent: Jun. 30, 2009

(54) WOVEN PROJECTION SCREEN

(75) Inventors: Huei Pei Kuo, Cupertino, CA (US); Laurence M. Hubby, Jr., Palo Alto, CA (US); Mark W. Van Order, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 11/796,945

(22) Filed: Apr. 30, 2007

(51) Int. Cl.
*G03B 21/56* (2006.01)
*G03B 21/60* (2006.01)

(52) U.S. Cl. ...................... 359/443; 359/459
(58) Field of Classification Search ............. 359/443, 359/449, 459, 461
See application file for complete search history.

(56) References Cited

U.S. PATENT DOCUMENTS

| | | | | |
|---|---|---|---|---|
| 1,810,169 A | * | 6/1931 | Gray | 442/44 |
| 3,692,384 A | * | 9/1972 | Kimura et al. | 359/445 |
| 4,006,965 A | * | 2/1977 | Takada et al. | 359/443 |
| 4,132,462 A | * | 1/1979 | Hottel et al. | 359/443 |
| 5,361,163 A | | 11/1994 | Matsuda et al. | |
| 7,113,332 B1 | | 9/2006 | Risher | |

* cited by examiner

*Primary Examiner*—Christopher Mahoney

(57) ABSTRACT

A woven projection screen includes a viewing portion having a front side facing toward a viewing zone. The viewing portion includes a plurality of first filaments having asymmetric geometries in cross-section and having reflective surfaces for primarily reflecting an image signal light and a plurality of second filaments. The plurality of first filaments are interwoven with the plurality of second filaments, such that, the plurality of second filaments are configured to support the plurality of first filaments in a manner that causes the reflective surfaces to be positioned to redirect the image signal light into a range of angles toward the viewing zone.

20 Claims, 6 Drawing Sheets

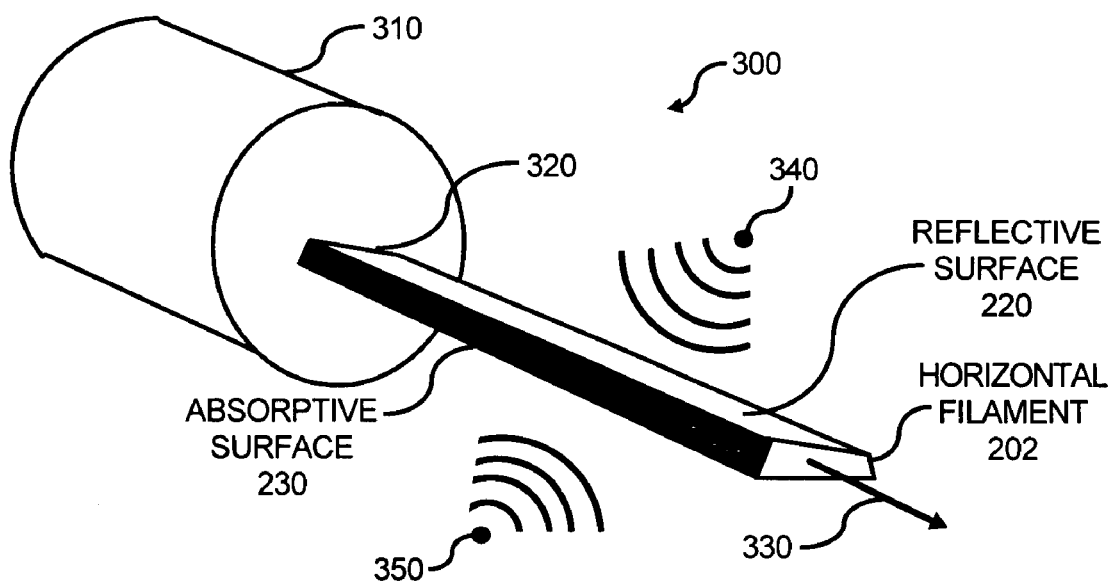
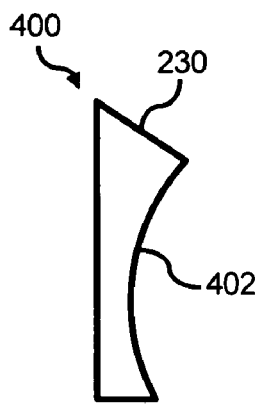 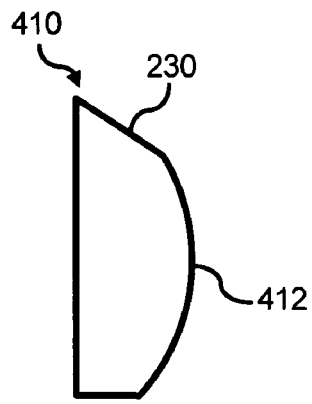 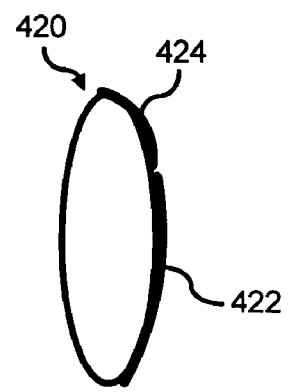
*FIG. 4A*  *FIG. 4B*  *FIG. 4C*

WOVEN PROJECTION SCREEN

BACKGROUND

Projection screens are often employed to enhance the display of light projected from projectors by reflecting the light to be viewable by one or more people. Conventional projection screens, however, are particularly susceptible to contrast ratio degradation because typical projection screens reflect ambient light as readily as the image projected from projectors.

The contrast ratio is the ratio of the brightness of a white pixel to the brightness of a black pixel. A black pixel is generally as white as the ambient lighting because conventional projection screens are typically highly reflective. As such, ambient light incident upon the projection screen is often reflected back to the viewer, thereby reducing the contrast ratio of the image projected from projectors.

Prior approaches to reducing the effects of ambient light have been to use gray screens to improve the contrast level. However, this technique also reduces the overall brightness of the intended image. Accordingly, conventional gray screens require the use of relatively more expensive projectors having substantially higher-powered light sources capable of casting more light to compensate for the reduction in overall brightness.

Other conventional techniques involve various techniques that have the effect of focusing more of the reflected projector light into a limited viewing cone, which is called "screen gain". Outside of this viewing cone, the picture quality drops, while inside the viewing cone, the brightness is increased with limited effect on improving the contrast ratio, as the ambient light is also affected by the screen gain. Some high-gain projection screens have utilized an array of lenses over a reflective background to direct projected light back to a viewer. Although these screens preferentially reject ambient light with respect to projected light, they suffer from a severely limited viewing angle and are associated with relatively high costs.

BRIEF DESCRIPTION OF THE DRAWINGS

Features of the present invention will become apparent to those skilled in the art from the following description with reference to the figures, in which:

FIG. 3 illustrates a simplified perspective view illustration of a fabrication technique that may be employed to create the horizontally extending filaments depicted in FIGS. 2A-2D, according to an embodiment of the invention;

FIGS. 4A-4C, respectively, illustrate various cross-sectional shapes of the horizontally extending filaments, according to an embodiment of the invention;

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a woven projection screen and a method for fabricating the woven projection screen. Generally speaking, the woven projection screen is structured and configured to substantially discriminate between an image signal light projected onto the screen by a projector and ambient light, to thereby improve contrast and brightness of the image signal light. In addition, the woven projection screen, and its component parts, are structured and configured to be fabricated in a relatively simple and inexpensive manner.

The projection screen includes a viewing portion formed of a plurality of horizontally extending filaments interwoven with a plurality of vertically extending filaments. The horizontally extending filaments are each provided with a reflective surface and the vertically extending filaments support the horizontally extending filaments in a manner that causes the reflective surfaces to redirect image signal light toward a viewing zone. In one regard, the horizontally extending filaments may be preprocessed to include the reflective surfaces, for instance, through directional deposition of reflective material, prior to being interweaved with the plurality of vertically extending filaments.

The horizontally extending filaments and the vertically extending filaments may be interweaved in a manner that creates gaps in the projection screen. The gaps may be formed to enable a substantial portion of the light falling onto the projection screen to pass therethrough and enable a camera or an observer positioned behind the projection screen to obtain a reasonably clear image of the objects or persons positioned in front of the projection screen.

Although particular reference is made throughout the present disclosure of projectors being positioned beneath or below a central horizontal axis of the projection screen, it should readily be understood that the projection screens disclosed herein may alternatively be configured to receive image signal lighting from projectors located above the central horizontal axis of the projection screens without departing from a scope of the projection screens disclosed herein.

Figure 1:
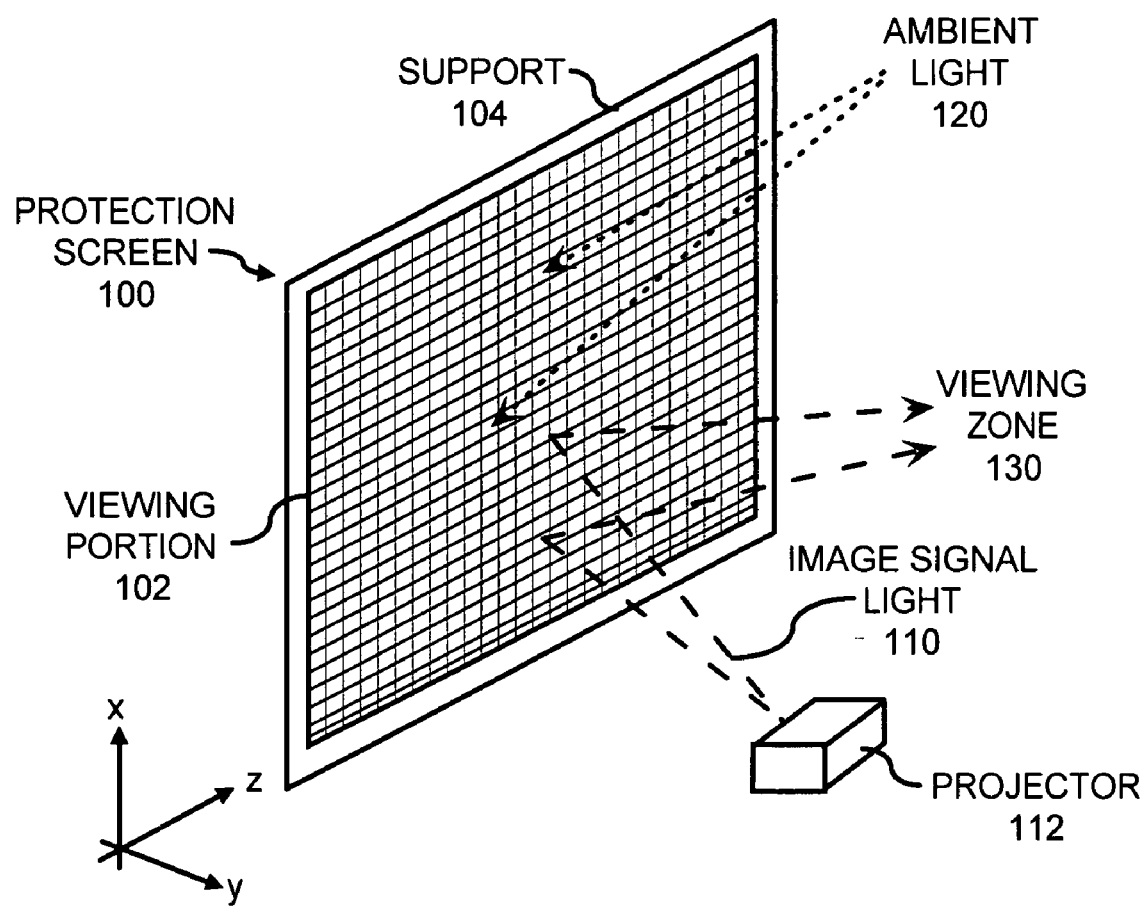
FIG. 1 shows a woven projection screen, according to an embodiment of the invention.

With reference first to FIG. 1, there is shown a woven projection screen 100, according to an example. It should be understood that the following description of the projection screen 100 is but one manner of a variety of different manners in which the projection screen 100 may be configured. In addition, it should be understood that the projection screen 100 may include additional features and that some of the features described herein may be removed and/or modified without departing from a scope of the projection screen 100.

To facilitate the description of the projection screen 100, the orientations with respect to the projection screen 100 are referenced to the coordinate system with three axes that are depicted in FIG. 1 as being orthogonal to each other. The coordinate system is chosen to be fixed to the screen projection screen 100.

The projection screen 100 may be extended across a vertical wall for viewing by observers facing the projection screen 100. In this implementation, the x-axis is selected to be pointing in the vertical direction, the y-axis is selected to be pointing in the horizontal direction perpendicular to the viewing surface of the projection screen 100, and the z-axis is selected to be pointing in the plane of the viewing side surface of the projection screen 100. Regardless of the actual orientation of the projection screen 100, the x-axis may be referred to as the vertical axis and the direction along the x-axis may be referred to as the vertical direction or the x-direction. Likewise, the y-axis may be referred to as the horizontal-normal axis and the direction along the y-axis as the horizontal-normal direction or the y-direction. In addition, the z-axis may be referred to as the horizontal-in-plane axis and the direction along the z-axis as the horizontal-in-plane direction or the z-direction.

As shown in FIG. 1, the projection screen 100 includes a viewing portion 102 supported by a support 104. Generally speaking, the viewing portion 102 is structured and configured to substantially discriminate an image signal light 110 (shown as dashed lines) from ambient light 120 (shown as dotted lines), to thereby improve the brightness and the contrast ratio of the image signal light 110 reflected from the viewing portion 102. More particularly, the viewing portion 102 is structured and configured to primarily reflect the image signal light 110 from the projection screen 100 in a direction toward a viewing zone 130 located at a range of nominal viewing distances from the projection screen 100. The viewing portion 102 is also structured and configured to primarily absorb the ambient light 120, which impinges on the viewing portion 102 from a direction and angle that differs from the direction and angle of the image signal light 110.

The projection screen 100 therefore enables the viewing of relatively high contrast images from an image signal light source 112, which may comprise, for instance, a DLP projector, an LCD projector, combination projector devices, etc., in an environment containing ambient light 120. The ambient light 120 may originate from at least one ambient light source (not shown), such as, ceiling or wall mounted light sources, sunlight through a window, indirect light, etc.

As also shown in FIG. 1, the viewing portion 102 is composed of a plurality of relatively long and narrow members, such as, filaments, which have been interwoven as discussed below to enable the projection screen 100 to substantially discriminate between the image signal light 110 and the ambient light 120. Although the viewing portion 102 is described herein as being formed of filaments, the components forming the viewing portion 102 may also be described as fibers, wires, cords, strands, etc. In this respect, the term "filament" is not meant to limit the viewing portion 102 in any respect.

Figure 2A:
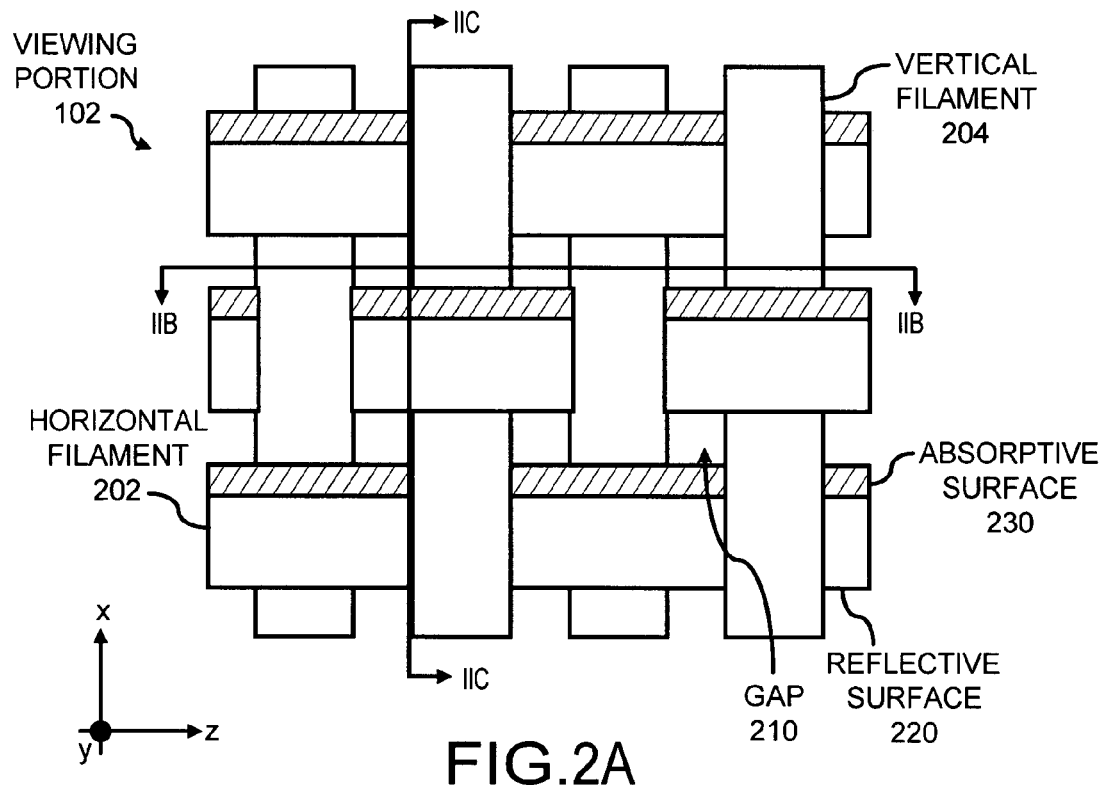
FIG. 2A shows an enlarged frontal view of part of the woven projection screen depicted in FIG. 1, according to an embodiment of the invention.
Figure 2B:
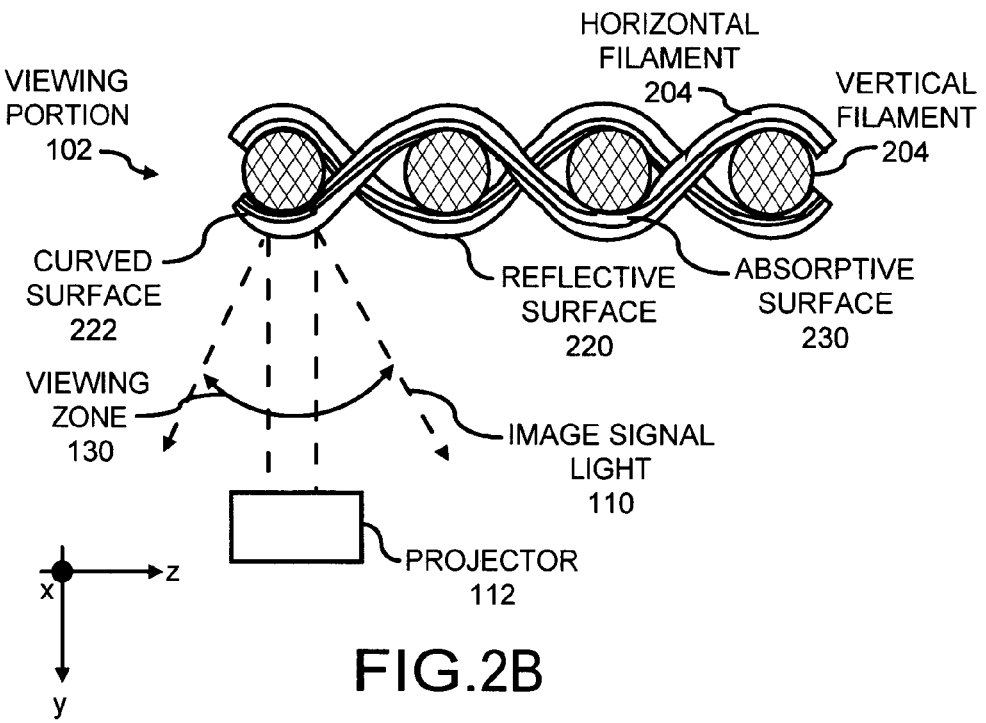
FIG. 2B shows a cross-sectional top view taken along lines IIB-IIB in FIG. 2A, according to an embodiment of the invention.
Figure 2C:
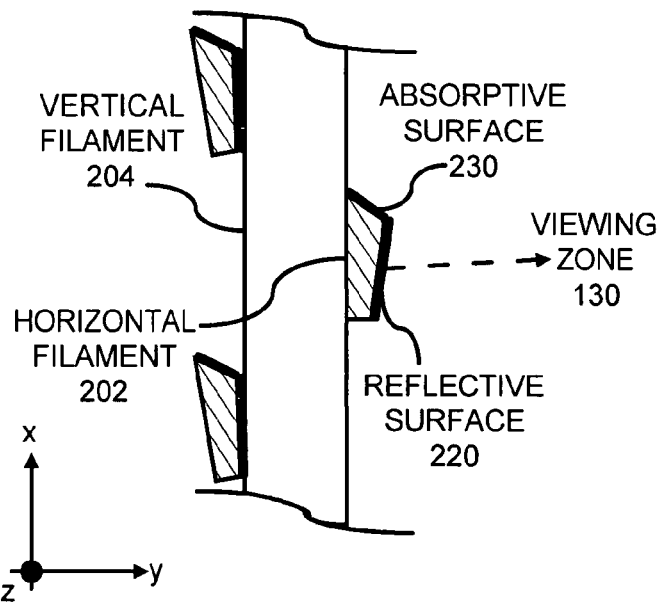
FIG. 2C shows a cross-sectional side view taken along lines IIC-IIC in FIG. 2A, according to an embodiment of the invention.

The interwoven structure of the viewing portion 102 is depicted in greater detail in FIGS. 2A-2C. With reference first to FIG. 2A, there is shown an enlarged frontal view of part of the viewing portion 102 depicted in FIG. 1, according to an example. As shown, the viewing portion 102 is formed of a plurality of interwoven first and second filaments 202 and 204. More particularly, the first filaments 202 comprise a plurality of horizontally extending filaments, which are interwoven with the second filaments 204, which comprise a plurality of vertically extending filaments. Although the first filaments 202 are described as being "horizontally extending" and the second filaments 204 are described as being "vertically extending", it should be understood that these terms are to include reasonable deviations from the horizontal and vertical planes, respectively, while still being considered as extending "horizontally" or "vertically".

As shown in FIG. 2A, the viewing portion 102 is formed into a grid structure by the interweaving of the horizontally extending filaments 202 and the vertically extending filaments 204. The grid structure of the viewing portion 102 includes a plurality of gaps 210 formed between adjacent horizontally extending filaments 202 and adjacent vertically extending filaments 204. The gaps 210 may be provided to generally enable light to pass through the viewing portion 102. Thus, for instance, a camera or a person positioned behind the viewing portion 102 may capture images of a viewer in the viewing zone 130 through a perspective of images displayed on the viewing portion 102, as may be implemented in a teleconferencing system. The gaps 210 may, however, be optional because the horizontally extending filaments 202 and the vertically extending filaments 204 may be interwoven in manners to substantially prevent formation of the gaps 210.

As discussed above, the viewing portion 102 is configured to substantially discriminate between image signal light 110 and ambient light 120. In this regard, each of the horizontally extending filaments 202 includes a plurality of surfaces configured to direct light impinging on the surfaces either toward or away from a viewing zone 130, depending upon the angle at which the light impinges on the horizontally extending filaments 202. More particularly, the surfaces are configured to primarily direct light originating from a first direction (the image signal light 110) toward the viewing zone 130 and to primarily direct light emanating from a second direction (the ambient light 120) away from the viewing zone 130.

Each of the horizontally extending filaments 202 includes a light reflective surface 220 configured to primarily reflect the image signal light 110 toward the viewing zone 130 and to reflect the ambient light 120 away from the viewing zone 130. The light reflective surfaces 220 may be provided with relatively thin films of material, such as, aluminum, or other suitable reflective materials. In addition, the reflective material may comprise a conglomerate of reflective particles, each with a linear dimension of about one to one hundred μm. Alternatively, however, the light reflective surfaces 220 may comprise relatively smooth sections of the horizontally extending filaments 202, and may therefore comprise the materials from which the horizontally extending filaments 202 are fabricated.

As discussed in greater detail herein below, reflective material, such as those described above, may be applied onto the horizontally extending filaments 202 prior to weaving of the horizontally extending filaments 202 with the vertically extending filaments 204. In one regard, the reflective material may be applied onto the horizontally extending filaments 202 during a fabrication process of the horizontally extending filaments 202. In addition, or alternatively, the reflective materials may be deposited following weaving of the horizontally extending filaments 202 with the vertically extending filaments 204. In either example, the reflective materials may be deposited at an oblique angle with respect to the vertical axis of the horizontally extending section 202, such that, substantially only the light reflective surfaces 202 receive the reflective material. Thus, for instance, the reflective materials may be deposited at an angle that is similar to the angle that the image signal light 110 is configured to impinge on the viewing portion 102.

As further shown in FIG. 2A, each of the horizontally extending filaments 202 includes a light absorptive surface 230. The light absorptive surfaces 230 are structured and configured to primarily absorb light not originating from the projector 112, such as ambient light 120. In this regard, the light absorptive surfaces 230 may be positioned at one or more angles, with respect to the vertical axis, that substantially differ from the angles at which the light reflective surfaces 220 are positioned. In addition, the light absorptive surfaces 230 may be provided with a relatively thin film of dark material, such as, relatively small, dark colored particles, relatively dark paint or ink, etc. In any event, the dark material may be deposited at various angles that are substantially perpendicular to the angles of the light absorptive surfaces 230.

In addition, or alternatively, the horizontally absorptive surface 230 may be formed of a light absorptive material or color, which may obviate the need for light absorbing material deposition. In any regard, the light absorptive surfaces 230 are generally configured to absorb a substantial portion of ambient light 120 and therefore substantially prevent the ambient light 120 from being reflected toward the viewing zone 130.

The vertically extending filaments 204 may comprise materials that are relatively more rigid than the horizontally extending filaments 202, in one example. In another example, the vertically extending filaments 202 and the horizontally extending filaments 204 may comprise the same or similar materials; however, the vertically extending filaments 204 may comprise relatively larger cross-sectional areas as compared with the cross-sectional areas of the horizontally extending filaments 202, to thereby cause the vertically extending filaments 204 to be relatively stiffer.

In either example, the horizontally extending filaments 202 may be deflected around the vertically extending filaments 204, as shown in FIG. 2B, which shows a cross-sectional top view taken along lines IIB-IIB in FIG. 2A. The deflection of the horizontally extending filaments 202 around the vertically extending filaments 204 generally causes the light reflective surfaces 220 to have curved surfaces 222. The curved surfaces 222 of the light reflective surfaces 220 generally increase the spread of the image signal light 110 across the viewing zone 130, as also depicted in FIG. 2B.

In addition, as shown in FIG. 2C, which depicts a cross-sectional side view taken along lines IIC-IIC in FIG. 2A, the horizontally extending filaments 202 are interwoven with vertically extending filaments 204 in a manner that causes the reflective surfaces 220 to face toward the viewing zone 130, regardless of whether the horizontally extending filaments 202 are located in front of or behind the vertically extending filaments 204. As such, the horizontally extending filaments 202 may be maintained in place such that the reflective surfaces face toward the viewing zone 130, for instance, due to the asymmetric cross-sectional shape of the horizontally extending filaments 202. In addition, the manner in which the horizontally extending filaments 202 are interweaved with the vertically extending filaments 204 may also be controlled to substantially ensure that the horizontally extending filaments 202 do not become twisted and are held in the desired arrangement by the vertically extending filaments 204.

Figure 2D:
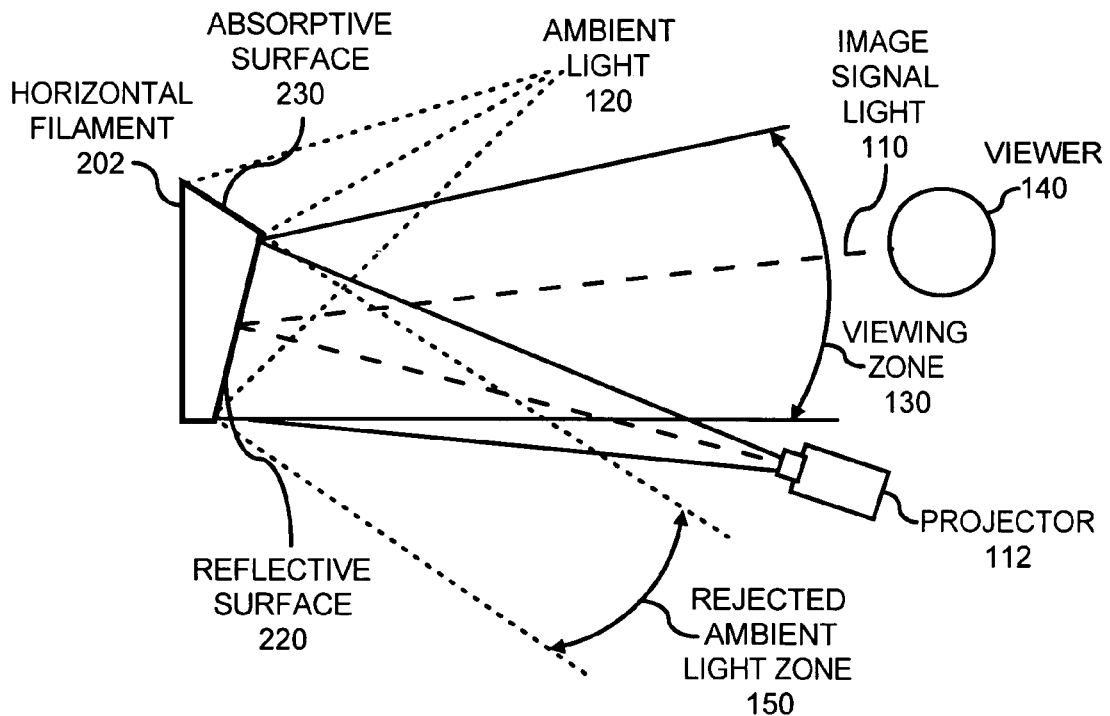
FIG. 2D shows an enlarged cross-sectional side view of a horizontally extending filament depicted in FIGS. 2A-2C, according to an embodiment of the invention.

With reference now to FIG. 2D, there is shown an enlarged cross-sectional side view of a horizontally extending filament 202, according to an example. As shown in FIG. 2D, the reflective surface 220 of the horizontally extending filament 202 is configured to redirect image signal light 110 originating from a projector 112 toward a viewer 140 located in the viewing zone 130. In addition, the reflective surface 220 is configured to primarily redirect ambient light 120 impinging thereon toward a direction away from the viewing zone 130, such as, a rejected ambient light zone 150. The absorptive surface 230 of the horizontally extending filament 202 is further configured to primarily absorb ambient light 120.

Although not explicitly shown in FIGS. 2A-2D, the reflective surfaces 220 of the horizontally extending filaments 202 may be formed at different angles with respect to each other depending upon the locations of the horizontally extending filaments 202 along the x-direction. In one respect, the angles of the reflective surfaces 220 may be varied along the x-direction to keep the reflected image signal light 110 centered about the viewing zone 130, since the image signal light source 112 may not be centrally located with respect to the viewing portion 102.

Various manners in which the horizontally extending filaments 202 and the vertically extending filaments 204 may be fabricated are described in the following figures. It should be understood that in the following descriptions of various fabrication methods, some of the steps may be removed and/or modified and that additional steps may be added. In addition, it should be understood that various parts of the fabrication methods disclosed below may be implemented by a computerized controller. For instance, the tools used to form the filaments 202 and 204 may be computer-controlled.

With reference first to FIG. 3, there is shown a simplified perspective view illustration of a fabrication technique 300 that may be employed to create the horizontally extending filaments 202 depicted in FIGS. 2A-2D, according to an example. As shown therein, a base material 310 may be extruded, as indicated at element 320, by drawing the horizontally extending filament 202 through a shaped die (not shown) in the direction of the arrow 330. Alternatively, however, the base material 310 may be molded, cut, etc., to have the shape depicted in FIG. 3.

In any regard, the horizontally extending filament 202 may comprise cloth-like materials, Polyvinyl Chloride (PVC), Polypropylene (PP) and Polyethylene Terephthalate (PET), combinations thereof, metals, etc. In addition, although the horizontally extending filament 202 has been depicted as having a substantially solid cross-section, the horizontally extending filament 202 may also be substantially hollow.

In the example shown in FIG. 3, a reflective material 340 is applied to the reflective surface 220 after the horizontally extending filament 202 has been formed, but prior to weaving with the vertically extending filament 204. In addition, an absorptive material 350 is applied to the absorptive surface 230 after the horizontally extending filament 202 has been formed, but prior to weaving with the vertically extending filament 204. Either or both of the reflective material 340 and the absorptive material 350 may be applied through directional evaporation, roller coating, etc.

However, the base material 310 may be formed of an absorptive material, such as a black or other relatively dark material. In this example, only the reflective material 340 is provided on the reflective surface 220.

In a further example, the base material 310 may be formed of a transparent or translucent material, where the reflective surfaces 220 are coated with a reflective material. As used herein, the term "transparent" is generally defined to include the definitions of "capable of transmitting light so that objects or images can be seen if there were no intervening material," and "easily seen through." The base material 310 may be described as translucent; in that the base material 310 may be colored, polarized, and/or intentionally diffused.

Although the reflective surface 220 of the horizontally extending filament 202 has been depicted in FIGS. 2A-2D and 3 as being relatively flat, the reflective surface 220 may have various other shapes 400, 410, and 420 as depicted in FIGS. 4A-4C. More particularly, as respectively shown in FIGS. 4A-4C, the reflective surface 402, 412, 422 may comprise a relatively concave or a relatively convex configuration, which may be capable of increasing a spread of the image signal light 110, for instance in the vertical direction. As also shown in FIG. 4C, the absorptive surface 424 may also have a relatively convex configuration, which may, for instance, ease fabrication of the horizontally extending filament 202.

Figure 5:
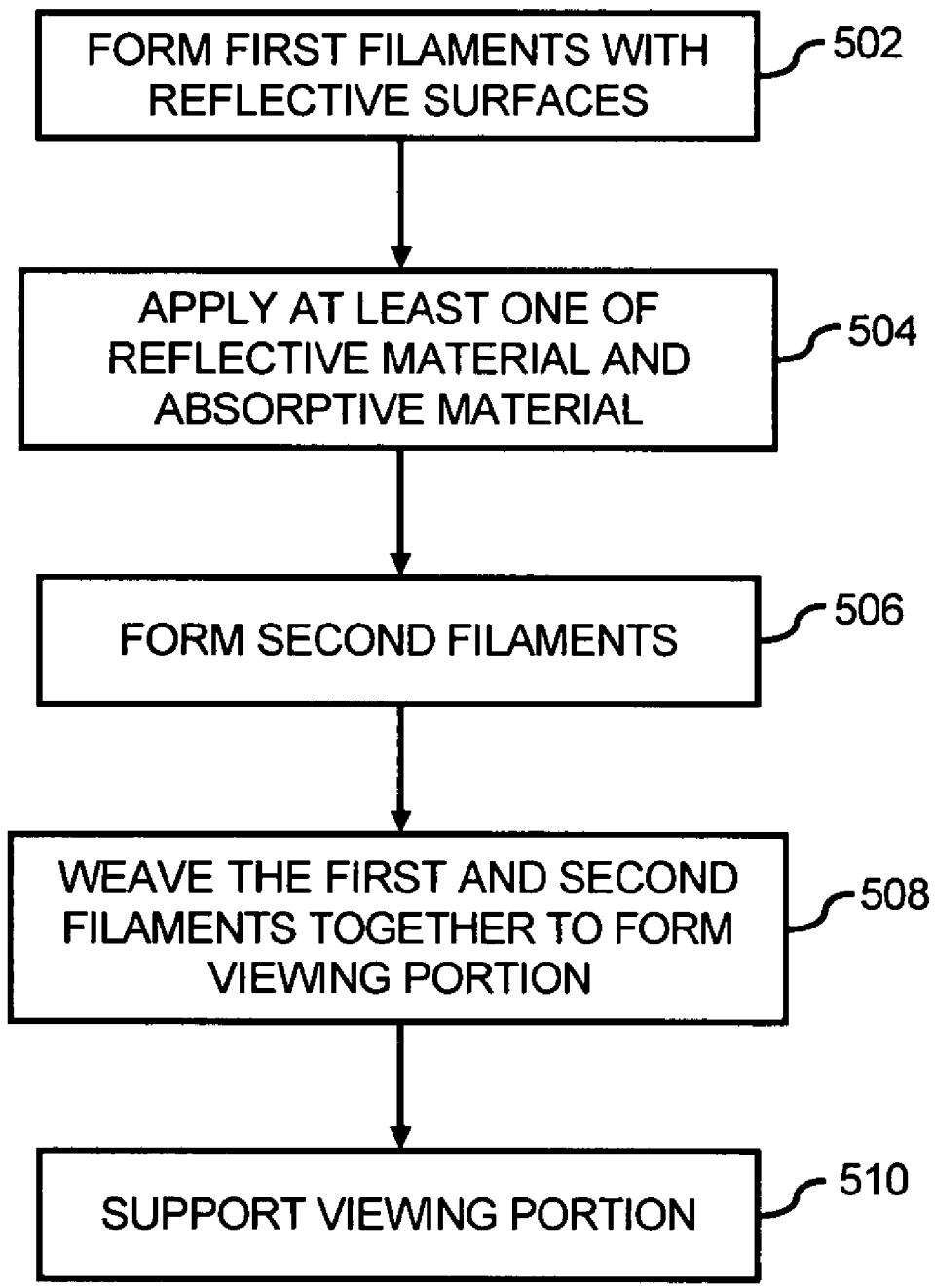
FIG. 5 shows a flow diagram of a method for fabricating a projection screen analyzing and visualizing a thermal profile of a room, according to an embodiment of the invention.

With reference now to FIG. 5, there is shown a flow diagram of a method 500 for fabricating a projection screen 100 having a viewing portion 102 formed of woven materials 202, 204, according to an example. It should be understood that the method 500 may include additional steps and that some of the steps described herein may be removed and/or modified without departing from a scope of the method 500.

At step 502, a plurality of first filaments 202 (horizontally extending filaments) are formed such that they each have reflective surfaces 220. As discussed above, the first filaments 202 may be formed through a variety of different processes, such as, extrusion, molding, cutting, etc.

At step 504, at least one of a reflective material 340 and an absorptive material 350 is applied to a surface of the first filaments 202. The reflective material 340 may be applied to the reflective surface 220 in instances where the first filaments 202 are formed of a non-reflective material, such as a light absorptive material. The absorptive material 350 may be applied to the absorptive surface 230 in instances where the first filaments 220 are formed of a reflective material. Both the reflective material 340 and the absorptive material 350 may be applied to the first filaments 202 in instances where the first filaments 202 have insufficient light reflective and light absorptive qualities.

Alternatively, however, in various instances, either or both of the reflective material 340 and the absorptive material 350 may be applied following weaving of the first filaments 202 and the second filaments 204. In this example, the materials 340 and/or 350 may be directionally applied to therefore substantially maximize discrimination of the image signal light 110 from the ambient light 120.

In any regard, the reflective material 340 may be applied onto the reflective surface 220 from angles that are substantially equivalent to a range of angles at which image signal light 110 is designed to impinge on the viewing portion 102, 102', 402, 402'. In addition, light absorbing material 350 may also be applied from angles that are substantially equivalent to a range of angles at which the viewing portion 102 is configured to receive ambient light 120.

At step 506, a plurality of second filaments 204 (vertically extending filaments) are formed. The second filaments 204 may be fabricated in any of the manners discussed above with respect to the first filaments 202. Alternatively, however, the second filaments 204 may be fabricated in various other manners and may be formed from various other types of materials. In any of these examples, the second filaments 204 may be relatively more rigid or stiffer than the first filaments 202.

Figure 6:
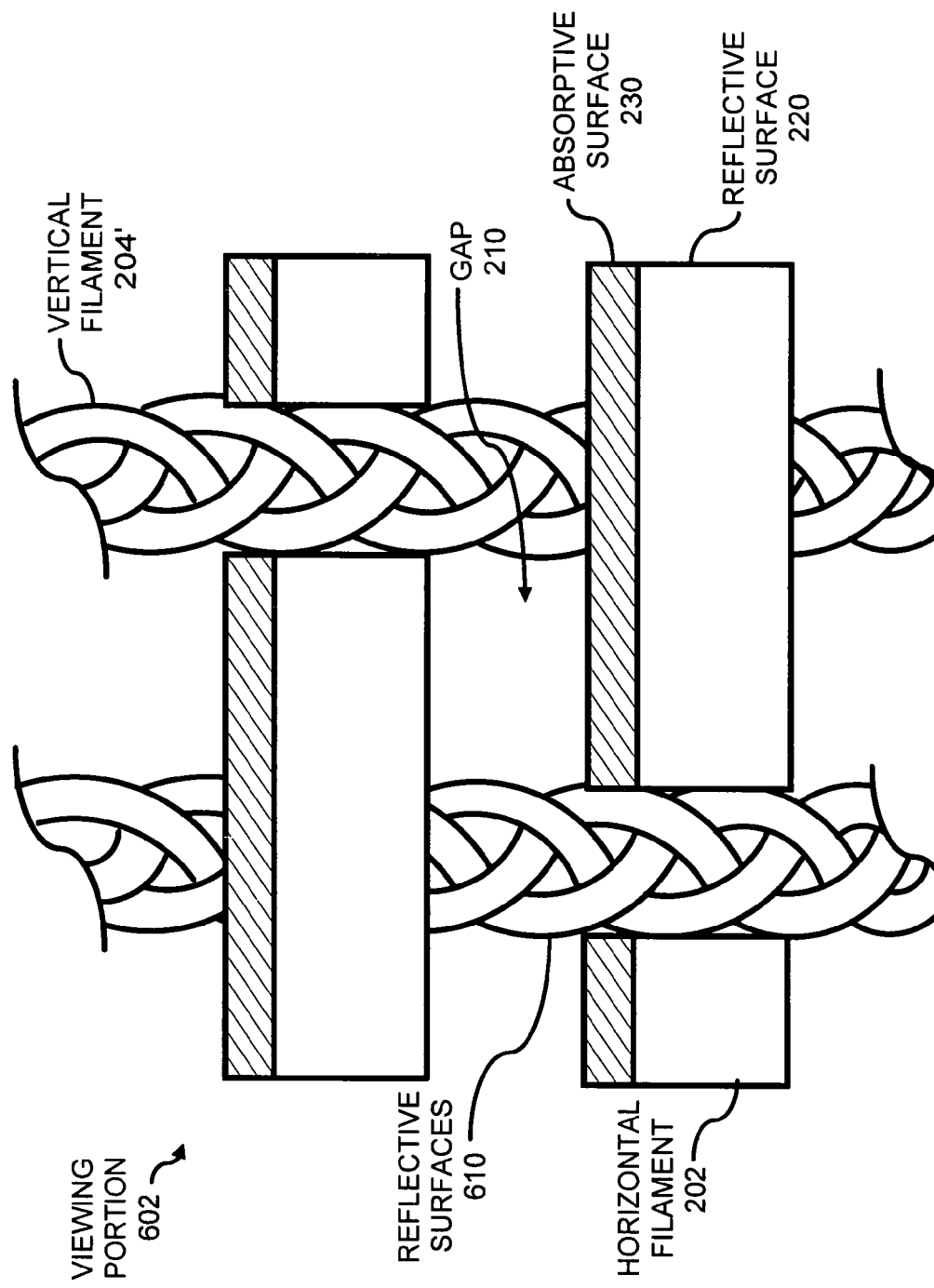
FIG. 6 illustrates a section of a viewing portion having vertically extending filaments that have surfaces facing multiple directions, according to an embodiment of the invention.

In one example, the second filaments 204 may comprise a black or relatively dark color, which provides for a relatively high level of contrast. In a second example, the second filaments 204 may be transparent, which provides for a relatively higher brightness. In either of the examples above, the second filaments 204 may comprise a structure having surfaces that face multiple directions, such as, the second filaments 204' having a braided structure depicted in FIG. 6, which shows a section of a viewing portion 602, according to another example.

The second filaments 204' (vertically extending filaments) may be employed to also primarily redirect image signal light 110 impinging thereon toward the viewing zone 130. The second filaments 204' may be made reflective by forming the second filaments 204' from a reflective material. Alternatively, a directional reflective material deposition process may be implemented to make various surfaces 610 the second filaments 204' directionally reflective. More particularly, for instance, a directional reflective material deposition process may be performed to create reflective surfaces 610 to thereby substantially cause the image signal light 110 impinging on the reflective surfaces 610 to primarily be redirected toward the viewing zone 130, without substantially causing the ambient light 120 to also be redirected toward the viewing zone 130.

At step 508, the first filaments 202 and the second filaments 204 are woven together to form the viewing portion 102 of the projection screen 100. As discussed above, the first filaments 202 may be interwoven with the second filaments 204, through a weaving process that causes the reflective surfaces 220 of the first filaments 202 to face a desired direction. In addition, the weaving process at step 508 may be performed to control the sizes of the gaps 210.

According to an example, a highly automated weaving machine, such as, a high speed loom (not shown), may be implemented to weave the first filaments 202 and the second filaments 204 together. The viewing portion 102 may therefore be fabricated through a relatively simple and inexpensive manner, as compared with conventional projection screen fabrication techniques.

At step 510, the viewing portion 510 may optionally be supported by a support 104. The support 510 may be implemented to provide tension on the viewing portion 102 to thereby maintain its shape. Step 510 is considered optional because in various instances the support 104 may be unnecessary, such as, when the first and second filaments 202, 204 have sufficient rigidity maintain a woven configuration.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A woven projection screen comprising:
   a viewing portion having a front side facing toward a viewing zone,
      a plurality of first filaments having asymmetric geometries in cross-section and reflective surfaces for primarily reflecting an image signal light; and
      a plurality of second filaments, wherein the plurality of first filaments are interwoven with the plurality of second filaments, and wherein the plurality of second filaments are configured to support the plurality of first filaments such that the reflective surfaces are positioned to redirect the image signal light into a range of angles toward the viewing zone.

2. The woven projection screen according to claim 1, wherein the plurality of first filaments extend in a substantially horizontal direction and wherein the plurality of second filaments extend in a substantially vertical direction.

3. The woven projection screen according to claim 2, wherein the viewing portion includes gaps between adjacent ones of the plurality of first filaments extending in the substantially horizontal direction and gaps between adjacent ones of the plurality of second filaments extending in the substantially vertical direction, such that light is visible through the viewing portion.

4. The woven projection screen according to claim 1, wherein each of the plurality of first filaments comprises an absorptive surface for primarily absorbing ambient light.

5. The woven projection screen according to claim 4, further comprising:
at least one of a reflective material applied to the reflective surface and an absorptive material applied to the absorptive surface.

6. The woven projection screen according to claim 4, wherein the plurality of first filaments are interwoven with the plurality of second filaments in a manner that substantially causes the absorptive surfaces to be oriented in a second predefined direction.

7. The woven projection screen according to claim 1, wherein the plurality of second filaments are substantially more rigid than the plurality of first filaments to thereby cause the plurality of first filaments to bend around the plurality of second filaments when they are woven together.

8. The woven projection screen according to claim 1, wherein each of the plurality of second filaments comprises one of a primarily light reflective color and a primarily light absorptive color.

9. The woven projection screen according to claim 1, wherein each of the plurality of second filaments comprises a substantially braided configuration.

10. The woven projection screen according to claim 1, wherein the plurality of second filaments are coated with a reflective material.

11. The woven projection screen according to claim 1, wherein the asymmetric geometries of the plurality of first filaments and the plurality of second filaments substantially prevent the plurality of first filaments from twisting, thereby enabling the reflective surfaces to be positioned to direct the image signal light into a range of angles toward the viewing zone.

12. A method of forming a projection screen, said method comprising:
forming a plurality of first filaments, said plurality of first filaments comprising asymmetric geometries in cross-section and a reflective surface for primarily reflecting an image signal light;
forming a plurality of second filaments, said plurality of second filaments being substantially more rigid than the plurality of first filaments; and
weaving the plurality of first filaments with the plurality of second filaments such that the reflective surfaces of the plurality of first filaments are caused to be oriented in a predefined direction.

13. The method according to claim 12, wherein weaving further comprises weaving the plurality of first filaments with the plurality of second filaments such that the plurality of first filaments extend in a substantially horizontal direction and the plurality of second filaments extend in a substantially vertical direction.

14. The method according to claim 12, wherein forming the plurality of first filaments further comprises one of extruding and molding the plurality of first filaments from a base material, said base material comprising one of a primarily light reflective material and a primarily light absorptive material.

15. The method according to claim 12, further comprising:
applying a light reflective material onto the reflective surfaces of the plurality of first filaments prior to the step of weaving.

16. The method according to claim 12, wherein each of the plurality of first filaments comprises an absorptive surface for primarily absorbing ambient light, and wherein the method further comprises:
applying a light absorptive material onto the absorptive surfaces of the plurality of first filaments prior to the step of weaving.

17. The method according to claim 12, wherein each of the plurality of first filaments comprises an absorptive surface for primarily absorbing ambient light, and wherein the method further comprises:
applying at least one of a reflective material onto the reflective surfaces and applying at least one of an absorptive material onto the absorptive surfaces following the step of weaving.

18. The method according to claim 12, wherein forming the plurality of second filaments further comprise forming each of the plurality of second filaments from one of a primarily light reflective material and a primarily light absorptive material.

19. The method according to claim 18, wherein forming the plurality of second filaments further comprises forming each of the plurality of second filaments to have a braided structure having surfaces that face multiple directions.

20. A projection system comprising:
means for displaying an image, said means for displaying including,
a plurality of first filaments having asymmetric geometries in cross-section, said plurality of first filaments comprising means for primarily reflecting an image signal light and means for primarily reflecting ambient light; and
a plurality of second filaments interwoven with the plurality of first filaments, wherein the plurality of second filaments are configured to support the plurality of first filaments in a manner that causes the means for primarily reflecting to redirect the image signal light toward a desired direction.

* * * * *

UNITED STATES PATENT AND TRADEMARK OFFICE
CERTIFICATE OF CORRECTION

| | | |
|---|---|---|
| PATENT NO. | : 7,554,730 B1 | Page 1 of 1 |
| APPLICATION NO. | : 11/796945 | |
| DATED | : June 30, 2009 | |
| INVENTOR(S) | : Huei Pei Kuo et al. | |

It is certified that error appears in the above-identified patent and that said Letters Patent is hereby corrected as shown below:

On the title page, in field (75), in "Inventors", in column 1, lines 3-4, delete "Palo Alto, CA (US)" and insert -- Corvallis, OR (US) --, therefor.

Signed and Sealed this

Twenty-fourth Day of November, 2009

David J. Kappos
*Director of the United States Patent and Trademark Office*